(12) United States Patent
Nan et al.

(10) Patent No.: US 12,525,023 B2
(45) Date of Patent: Jan. 13, 2026

(54) METHOD FOR DIVERSE SEQUENTIAL POINT CLOUD FORECASTING

(71) Applicants: TOYOTA RESEARCH INSTITUTE, INC., Los Altos, CA (US); CARNEGIE MELLON UNIVERSITY, Pittsburgh, PA (US); THE REGENTS OF THE UNIVERSITY OF CALIFORNIA, Oakland, CA (US)

(72) Inventors: Junyu Nan, Pittsburgh, PA (US); Xinshuo Weng, Toronto (CA); Jean Mercat, Mountain View, CA (US); Blake Warren Wulfe, San Francisco, CA (US); Rowan Thomas McAllister, San Jose, CA (US); Adrien David Gaidon, Mountain View, CA (US); Nicholas Andrew Rhinehart, Berkeley, CA (US); Kris Makoto Kitani, Pittsburgh, PA (US)

(73) Assignees: TOYOTA RESEARCH INSTITUTE, INC., Los Altos, CA (US); TOYOTA JIDOSHA KABUSHIKI KAISHA, Aichi-Ken (JP); CARNEGIE MELLON UNIVERSITY, Pittsburgh, PA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 296 days.

(21) Appl. No.: 18/484,374

(22) Filed: Oct. 10, 2023

(65) Prior Publication Data
US 2024/0290105 A1 Aug. 29, 2024

Related U.S. Application Data

(60) Provisional application No. 63/448,070, filed on Feb. 24, 2023.

(51) Int. Cl.
*G06V 20/56* (2022.01)
*G06V 10/24* (2022.01)
*G06V 10/82* (2022.01)

(52) U.S. Cl.
CPC .............. *G06V 20/56* (2022.01); *G06V 10/24* (2022.01); *G06V 10/82* (2022.01)

(58) Field of Classification Search
CPC ......... G06V 20/56; G06V 10/24; G06V 10/08
See application file for complete search history.

(56) References Cited

U.S. PATENT DOCUMENTS 11,100,646 B2 * 8/2021 Vora ........................ G06T 7/248
11,295,517 B2 * 4/2022 Zhou ...................... G06V 20/10
(Continued)

OTHER PUBLICATIONS

Weng, Xinshuo, et al. "Inverting the pose forecasting pipeline with SPF2: Sequential pointcloud forecasting for sequential pose forecasting." Conference on robot learning. PMLR, 2021. (Year: 2021).*
Luo, Shitong, and Wei Hu. "Diffusion probabilistic models for 3d point cloud generation." Proceedings of the IEEE/CVF conference on computer vision and pattern recognition. 2021. (Year: 2021).*
Vahdat, Arash, et al. "Lion: Latent point diffusion models for 3d shape generation." Advances in Neural Information Processing Systems 35 (2022): 10021-10039. (Year: 2022).*
(Continued)

*Primary Examiner* — Utpal D Shah
(74) *Attorney, Agent, or Firm* — SEYFARTH SHAW LLP

(57) ABSTRACT

A method for sequential point cloud forecasting is described. The method includes training a vector-quantized conditional variational autoencoder (VQ-CVAE) framework to map an output to a closest vector in a discrete latent space to obtain a future latent space. The method also includes outputting, by a trained VQ-CVAE, a categorical distribution of a probability of V vectors in a discrete latent space in response to an input previously sampled latent space and past point cloud sequences. The method further includes sampling an inferred future latent space from the categorical distribution of the probability of the V vectors in the discrete latent space. The method also includes predicting a future point cloud sequence according to the inferred future latent space and the past point cloud sequences. The method further
(Continued)

includes denoising, by a denoising diffusion probabilistic model (DDPM), the predicted future point cloud sequences according to an added noise.

20 Claims, 7 Drawing Sheets

(56) References Cited

U.S. PATENT DOCUMENTS

| | | | | |
|---|---|---|---|---|
| 11,620,527 B2* | 4/2023 | Murez | ................... | G06N 3/045 |
| | | | | 382/156 |
| 11,887,002 B2* | 1/2024 | Park | ...................... | G06N 3/082 |
| 2021/0327030 A1* | 10/2021 | Ollila | ........................ | G06T 5/70 |
| 2024/0005604 A1* | 1/2024 | Kreis | ..................... | G06V 10/44 |
| 2024/0193887 A1* | 6/2024 | Hao | ........................ | G06T 19/20 |

OTHER PUBLICATIONS

Xinshu Weng et al., S2Net: Stochastic Sequential Pointcloud Forecasting, https://www.xinshuowent.com/projects/S2Net.

Jumin Lee et al., Diffusion Probabilistic Models for Scene-Scale 3D Categorical Data, arXiv:2301.005274v1 [cs.CV] Jan. 2, 2023.

Xinshu Weng et al., Inverting the Pose Forecasting Pipeline with SPF2: Sequential Pointcloud Forecasting for Sequential Pose Forecasting, 4th Conference on Robot Learning (CoRL 2020), Cambridge MA, USA.

Xuebin Sun et al., A Novel Coding Architecture for LiDAR Point Cloud Sequence, IEEE Robotics and Automation Letters, vol. 5, No. 4, 2020.

David Deng et al., Temporal LiDAR Frame Prediction for Autonomous Driving, arXiv:2012.09409v1 [cs.CV] Dec. 17, 2020.

Benedikt Mersch et al., Self-supervised Point Cloud Prediction Using 3D Spatio-temporal Convolutional Networks, 5th Conference on Robot Learning (CoRL 2021), London, UK.

* cited by examiner

METHOD FOR DIVERSE SEQUENTIAL POINT CLOUD FORECASTING

CROSS-REFERENCE TO RELATED APPLICATION

The present application claims the benefit of U.S. Provisional Patent Application No. 63/448,070, filed Feb. 24, 2023, and titled "A METHOD FOR DIVERSE SEQUENTIAL POINT CLOUD FORECASTING," the disclosure of which is expressly incorporated by reference herein in its entirety.

BACKGROUND

Field

Certain aspects of the present disclosure generally relate to machine learning and, more particularly, a system and method for diverse sequential point cloud forecasting.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene, as performed by the human visual system.

Additionally, predicting the future motion of surrounding agents is a core problem in autonomous driving. Since each agent can take multiple plausible sequences of actions, it is important for the autonomous vehicle to predict a diverse set of plausible multi-agent trajectories, taking into account different valid actions that other agents may take, in order to plan the best action. A system and method for diverse sequential point cloud forecasting to predict a diverse set of plausible multi-agent trajectories in order to plan the best action, is desired.

SUMMARY

A method for sequential point cloud forecasting is described. The method includes training a vector-quantized conditional variational autoencoder (VQ-CVAE) framework to map an output to a closest vector in a discrete latent space to obtain a future latent space. The method also includes outputting, by a trained VQ-CVAE, a categorical distribution of a probability of V vectors in a discrete latent space in response to an input previously sampled latent space and past point cloud sequences. The method further includes sampling an inferred future latent space from the categorical distribution of the probability of the V vectors in the discrete latent space. The method also includes predicting a future point cloud sequence according to the inferred future latent space and the past point cloud sequences. The method further includes denoising the predicted future point cloud sequences using a denoising diffusion probabilistic model (DDPM).

A non-transitory computer-readable medium having program code recorded thereon for sequential point cloud forecasting is described. The program code is executed by a processor. The non-transitory computer-readable medium includes program code to train a vector-quantized conditional variational autoencoder (VQ-CVAE) framework to map an output to a closest vector in a discrete latent space to obtain a future latent space. The non-transitory computer-readable medium also includes program code to output, by a trained VQ-CVAE, a categorical distribution of a probability of V vectors in the discrete latent space in response to an input previously sampled latent space and past point cloud sequences. The non-transitory computer-readable medium further includes program code to sample an inferred future latent space from the categorical distribution of a probability of the V vectors in the discrete latent space. The non-transitory computer-readable medium also includes program code to predict a future point cloud sequence according to the inferred future latent space and the past point cloud sequences. The non-transitory computer-readable medium further includes program code to denoising the predicted, future point cloud sequences using a denoising diffusion probabilistic model (DDPM).

A system for sequential point cloud forecasting is described. The system includes a vector-quantized (VQ) conditional variational autoencoder (VQ-CVAE) training module to train a VQ-CVAE framework to map an output to a closest vector in a discrete latent space to obtain a future latent space. The system also includes a trained VQ-CVAE to output a categorical distribution of a probability of V vectors in the discrete latent space in response to an input previously sampled latent space and past point cloud sequences. The system further includes a latent space inference model to sample an inferred future latent space from the categorical distribution of a probability of the V vectors in the discrete latent space. The system also includes a point cloud prediction model to predict a future point cloud sequence according to the inferred future latent space and the past point cloud sequences. The system further includes a point cloud denoising model to denoise the predicted, future point cloud sequences using a denoising diffusion probabilistic model (DDPM).

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
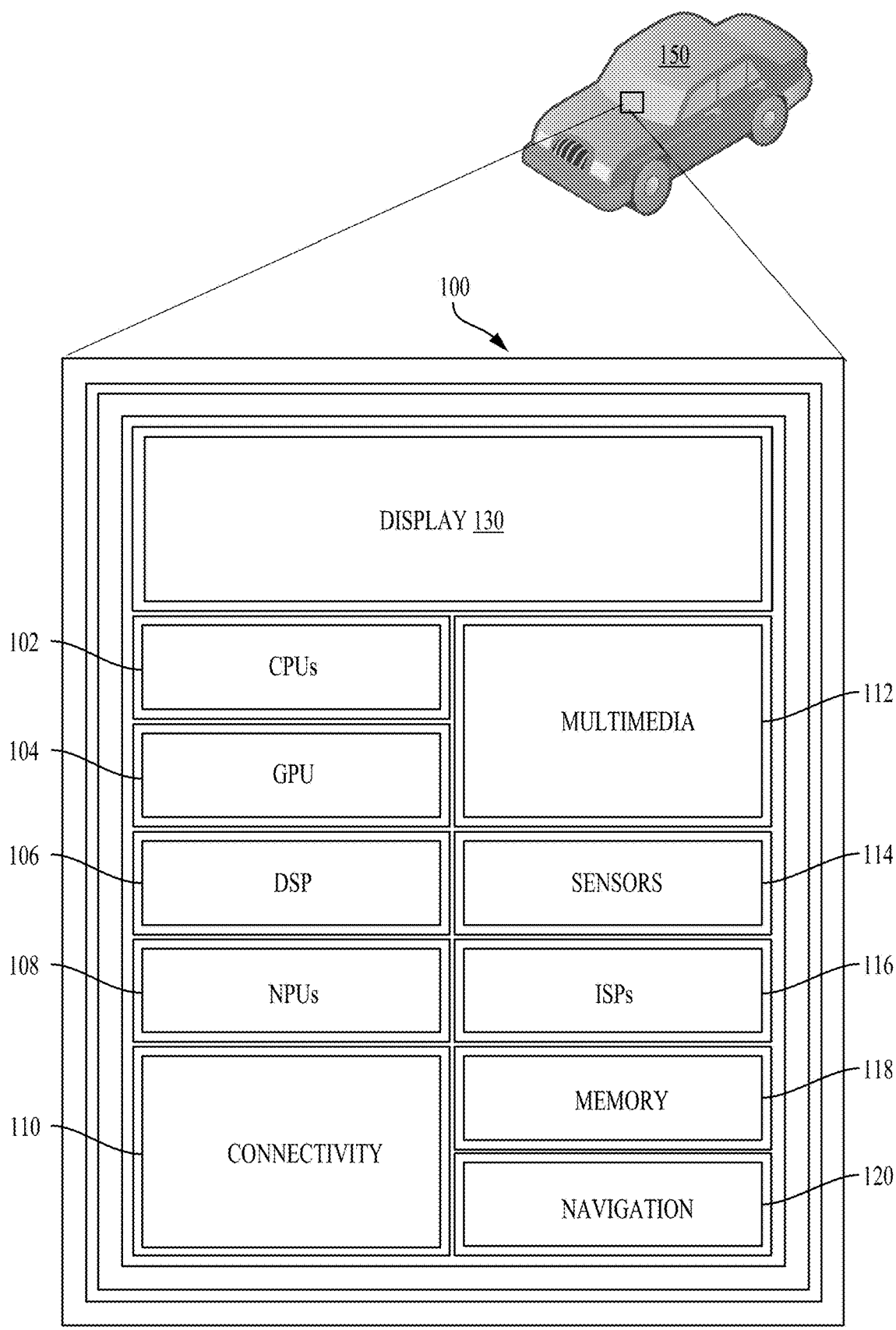
FIG. 1 illustrates an example implementation of designing a system using a system-on-a-chip (SOC) for diverse sequential point cloud forecasting, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Predicting the future motion of surrounding agents is a core problem in autonomous driving. Since each agent can take multiple plausible sequences of actions, the future is uncertain. As a result, it is important for the autonomous vehicle to predict a diverse set of plausible multi-agent trajectories, taking into account different valid actions that other agents may take, in order to plan the best action. Conventional techniques typically formulate this diverse forecasting task as trajectory forecasting, in which the past poses are taken as input, and a diverse set of future poses of the surrounding agents is predicted.

As described, sequential point cloud forecasting (SPF) refers to a scalable, sensor forecasting task. Specifically, given a sequence of past point clouds captured by a LIDAR sensor, SPF predicts a future point cloud sequence. Additionally, SPF learning capability can scale in an unsupervised manner without involving any ground truth pose labels. By contrast, labels are specified by conventional trajectory forecasting approaches, because they assume upstream detection and tracking pipelines, which are trained with ground truth pose labels. Additionally, sensor forecasting directly produces joint predictions of an entire scene, while trajectory forecasting produces marginal forecasts for each agent, or involves special methods for joint forecasting.

Although SPF is scalable, it remains a challenging task, particularly in terms of generating diverse yet plausible predictions. Some aspects of the present disclosure are directed to a diverse sequential point cloud forecasting method that overcomes the noted challenges. In some aspects of the present disclosure, the diverse SPF system is composed of a vector-quantized conditional variational autoencoder (VQ-CVAE) stage, followed by a partial denoising diffusion probabilistic model (DDPM). Unlike standard DDPMs, the forward and backward processes of a partial DDPM involves a fraction of the total number of steps. At inference time, the diverse SPF samples from the VQ-CVAE, which are an approximation of the real data distribution, add noise to the sample, and start the denoising process from the diffused sample. This diverse SPF system improves the diversity of future point cloud predictions by using a discrete latent space, and improves the fidelity of the predictions via a partial denoising process.

FIG. 1 illustrates an example implementation of the aforementioned system and method for diverse sequential point cloud forecasting using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry by prediction future point cloud sequences based on in an image captured by the sensor processor 114. The instructions loaded into a processor (e.g., CPU 102) may also include code for planning and control (e.g., intention prediction of the ego vehicle) in response to diverse sequential point cloud forecasting based on an image captured by the sensor processor 114.

The instructions loaded into a processor (e.g., NPU 108) may also include program code to train a vector-quantized conditional variational autoencoder (VQ-CVAE) framework to map an output to a closest vector in a discrete latent space to obtain a future latent space. The instructions loaded into a processor (e.g., NPU 108) may also include program code to output, by a trained VQ-CVAE, a categorical distribution of a probability of V vectors in a discrete latent space in response to an input previously sampled latent space and past point cloud sequences. The instructions loaded into a processor (e.g., NPU 108) may also include program code to sample an inferred future latent space from the categorical distribution of the probability of the V vectors in the discrete latent space. The instructions loaded into a processor (e.g., NPU 108) may also include program code to predict a future point cloud sequence according to the inferred future latent space and the past point cloud sequences. The instructions loaded into a processor (e.g., NPU 108) may also include program code to denoise, by a denoising diffusion probabilistic model (DDPM), the predicted future point cloud sequence according to an added noise.

Figure 2:
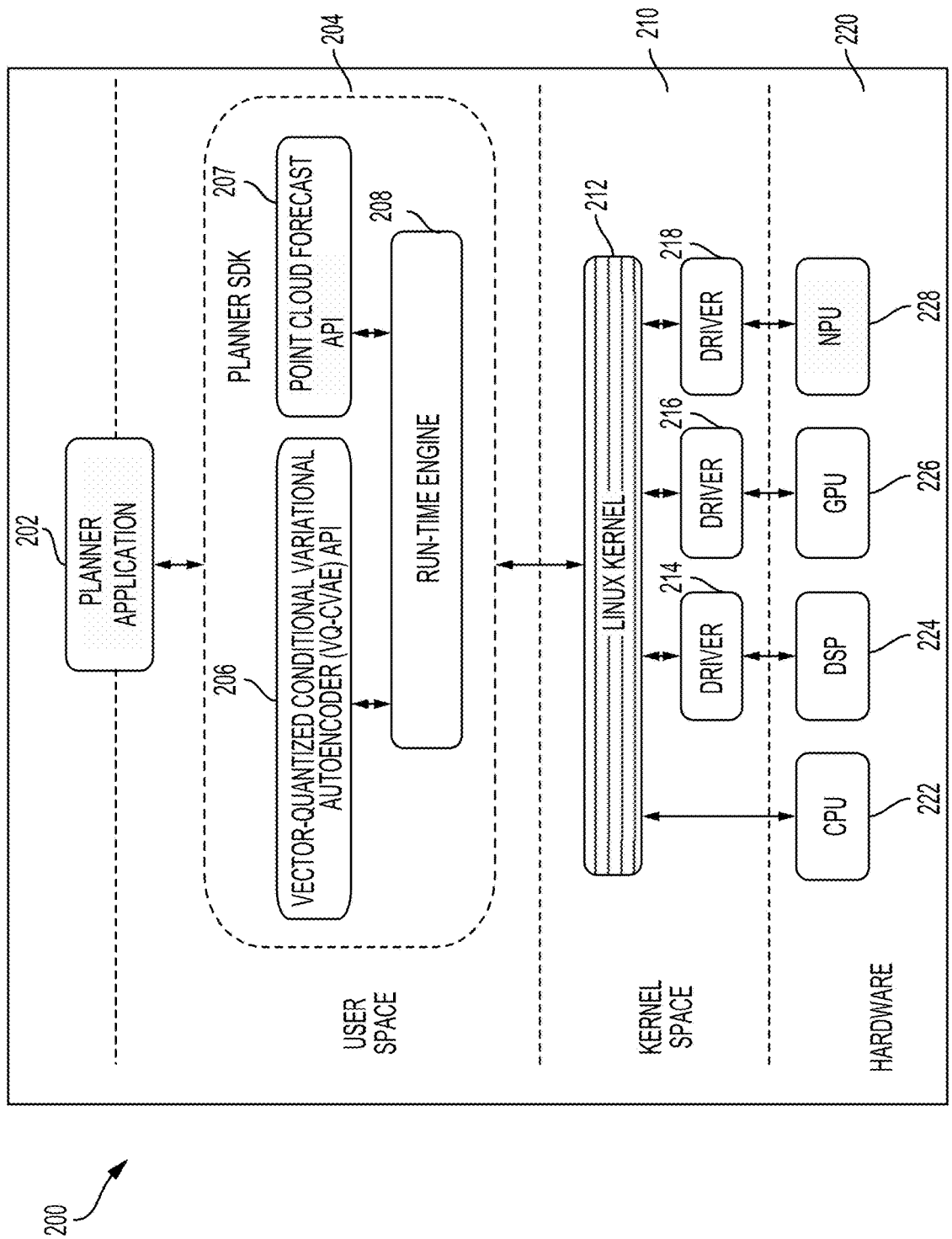
FIG. 2 is a block diagram illustrating a software architecture that may modularize functions for diverse sequential point cloud forecasting, according to aspects of the present disclosure.

FIG. 2 is a block diagram illustrating a software architecture 200 that may modularize functions for diverse sequential point cloud forecasting, according to aspects of the present disclosure. Using the architecture, a planner application 202 is designed to cause various processing blocks of a system-on-a-chip (SOC) 220 (for example a CPU 222, a DSP 224, a GPU 226, and/or an NPU 228) to perform supporting computations during run-time operation of the planner application 202.

The planner application 202 may be configured to call functions defined in a user space 204 that may, for example, provide for diverse sequential point cloud forecasting from LiDAR captured by an ego vehicle. The planner application 202 may make a request to compile program code associated with a library defined in a VQ-CVAE application programming interface (API) 206 to output a categorical distribution of a probability of V vectors in a discrete latent space in response to an input previously sampled latent space and past point cloud sequences.

The planner application 202 may make a request to compile program code associated with a library defined in a point cloud forecast API 207 to sample an inferred future latent space from the categorical distribution of the probability of the V vectors in the discrete latent space. The point cloud forecast API 207 also predicts a future point cloud sequence according to the inferred future latent space and past point cloud sequences. The planner application 202 may plan a trajectory of the ego vehicle according to the predicted future point cloud sequence of, for example, agents in a scene surrounding the ego vehicle.

A run-time engine 208, which may be compiled code of a runtime framework, may be further accessible to the planner application 202. The planner application 202 may cause the run-time engine 208, for example, to perform sequential point cloud forecasting based on frames of a video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
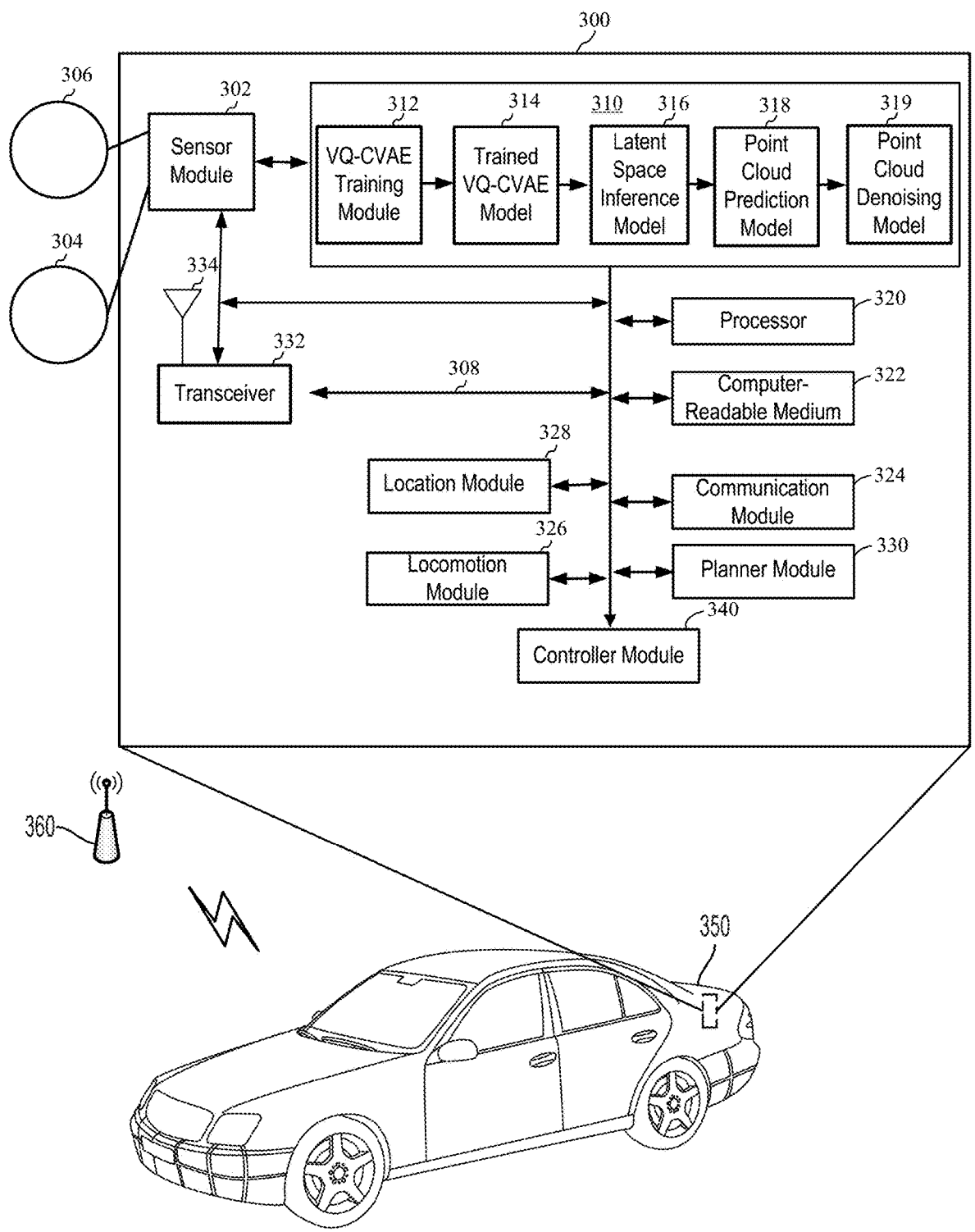
FIG. 3 is a diagram illustrating an example of a hardware implementation for a diverse sequential point cloud forecasting system, according to aspects of the present disclosure.

FIG. 3 is a diagram illustrating an example of a hardware implementation for a diverse sequential point cloud forecasting system 300 to account for different plausible actions of other agents, according to aspects of the present disclosure. The diverse sequential point cloud forecasting system 300 may be configured for planning and control of an ego vehicle using future point cloud sequences predicted from frames of a video stream captured during operation of a car 350. The diverse sequential point cloud forecasting system 300 may be a component of a vehicle, a robotic device, or other device.

For example, as shown in FIG. 3, the diverse sequential point cloud forecasting system 300 is a component of the car 350. Aspects of the present disclosure are not limited to the diverse sequential point cloud forecasting system 300 being a component of the car 350, as other devices, such as a bus, motorcycle, or other like vehicle, are also contemplated for using the diverse sequential point cloud forecasting system 300. The car 350 may be autonomous or semi-autonomous.

The diverse sequential point cloud forecasting system 300 may be implemented with an interconnected architecture, such as a controller area network (CAN) bus, represented generally by an interconnect 308. The interconnect 308 may include any number of point-to-point interconnects, buses, and/or bridges depending on the specific application of the diverse sequential point cloud forecasting system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The diverse sequential point cloud forecasting system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the forecast sequential point clouds and/or planned actions from the ego perception module 310 to a server (not shown).

The diverse sequential point cloud forecasting system 300 includes the processor 320 coupled to the computer-readable medium 322. The processor 320 performs processing, including the execution of software stored on the computer-readable medium 322 to provide sequential point cloud forecasting functionality, according to aspects of the present disclosure. The software, when executed by the processor 320, causes the diverse sequential point cloud forecasting system 300 to perform the various functions described for ego vehicle perception based on sequential point cloud forecasting from LiDAR captured by an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHZ (review); EN 12795:2002 Dedicated Short-Range Communication (DSRC)-DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection-Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the diverse sequential point cloud forecasting system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VOLTE), or any other mobile data network or combination of mobile data networks. Further, the network access point 360 may include one or more IEEE 802.11 wireless networks.

The diverse sequential point cloud forecasting system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Predicting the future motion of surrounding agents is a core problem in autonomous driving. Since each agent can take multiple plausible sequences of actions, the future is uncertain. As a result, it is important for the autonomous vehicle (e.g., the car 350) to predict a diverse set of plausible multi-agent trajectories, taking into account different valid actions that other agents may take, in order to plan the best action. Conventional techniques typically formulate this diverse forecasting task as trajectory forecasting, in which the past poses are taken as input, and a diverse set of future poses of the surrounding agents is predicted.

As noted above, sequential point cloud forecasting (SPF) refers to a scalable, sensor forecasting task. Specifically, given a sequence of past point clouds captured by a LIDAR sensor, SPF predicts a future point cloud sequence. Additionally, SPF learning capability can scale in an unsupervised manner without involving any ground truth pose labels. By contrast, labels are specified by conventional trajectory forecasting approaches, because they assume upstream detection and tracking pipelines, which are trained with ground truth pose labels. Additionally, sensor forecasting directly produces joint predictions of an entire scene, while trajectory forecasting produces marginal forecasts for each agent, or involves special methods for joint forecasting.

Some aspects of the present disclosure are directed to a diverse sequential point cloud forecasting method that overcomes the noted challenges. In some aspects of the present disclosure, the diverse SPF system is composed of a vector-quantized conditional variational autoencoder (VQ-CVAE) stage, followed by a partial denoising diffusion probabilistic model (DDPM). Unlike standard DDPMs, the forward and backward processes of a partial DDPM involves a fraction of the total number of steps. At inference time, the diverse SPF samples from the VQ-CVAE, which is an approximation of the real data distribution, adds noise to the sample, and starts the denoising process from the diffused sample. This diverse SPF system improves the diversity of future point cloud predictions by using a discrete latent space, and improves the fidelity of the predictions via a partial denoising process.

As shown in FIG. 3, the ego perception module 310 includes a vector-quantized (VQ) conditional variational autoencoder (VQ-CVAE) training module 312, a trained VQ-CVAE model 314, a latent space inference model 316, a point cloud prediction model 318, and a point cloud denoising model 319. The VQ-CVAE training module 312, the trained VQ-CVAE model 314, the latent space inference model 316, the point cloud prediction model 318, and the point cloud denoising model 319 may be components of a same or different artificial neural network. For example, the artificial neural network is a convolutional neural network (CNN) communicably coupled to a multi-camera rig. The ego perception module 310 receives a point cloud captured by a LIDAR configuration of the first sensor 304 and/or the second sensor 306, which is used to forecast future point clouds, according to aspects of the present disclosure.

The ego perception module 310 is configured to perform diverse sequential point cloud forecasting, beginning with the VQ-CVAE training module 312 to map an output to a closest vector in a discrete latent space to obtain a future latent space. In some aspects the present disclosure, a VQ-CVAE framework is trained according to a future point cloud, a previously sampled latent space, and a past point cloud sequence to generate the trained VQ-CVAE model 314. The trained VQ-CVAE model 314 is configured to output a categorical distribution of a probability of V vectors in a discrete latent space in response to an input, previously sampled latent space, and past point cloud sequences.

The ego perception module 310 further includes the latent space inference model 316 to sample an inferred future latent space from the categorical distribution of the probability of the V vectors in the discrete latent space output from the trained VQ-CVAE model 314. In some aspects of the present disclosure, the point cloud prediction model 318 is configured to predict a future point cloud sequence according to the inferred future latent space from the latent space inference model 316 and the past point cloud sequences. In this configuration, the predicted future point cloud sequence from the point cloud prediction model 318 is refined by the point cloud denoising model 319 using a denoising diffusion probabilistic model (DDPM). The refined, future point cloud sequence may be utilized for motion planning during operation of an ego vehicle, for example, as shown in FIGS. 4A and 4B.

Various aspects of the present disclosure may be implemented in an agent, such as a vehicle. The vehicle may operate in either an autonomous mode, a semi-autonomous mode, or a manual mode. In some examples, the vehicle may switch between operating modes.

Figure 4A:
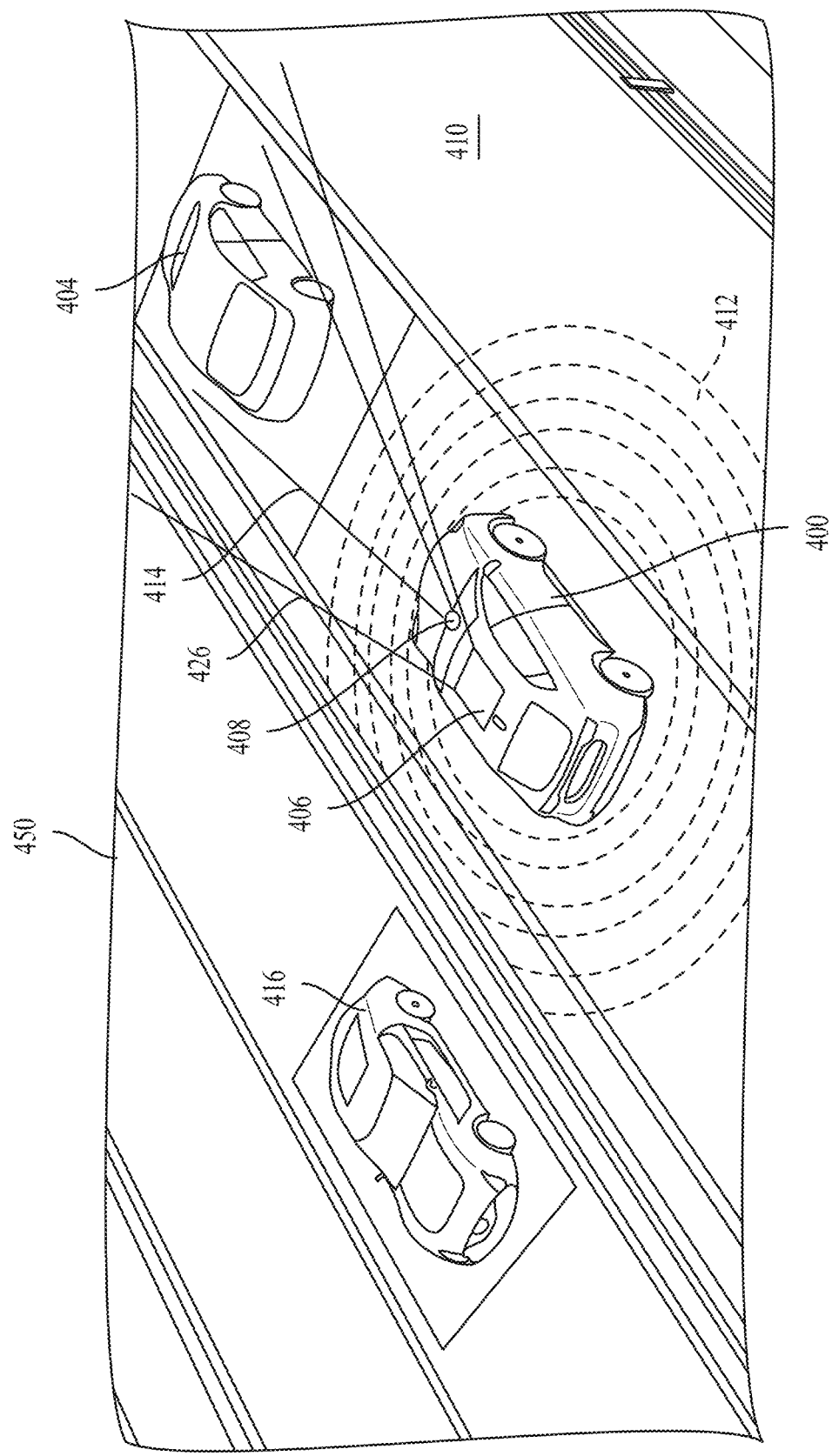
FIGS. 4A-4B are diagrams illustrating an example of a vehicle in an environment, according to various aspects of the present disclosure.
Figure 4B:
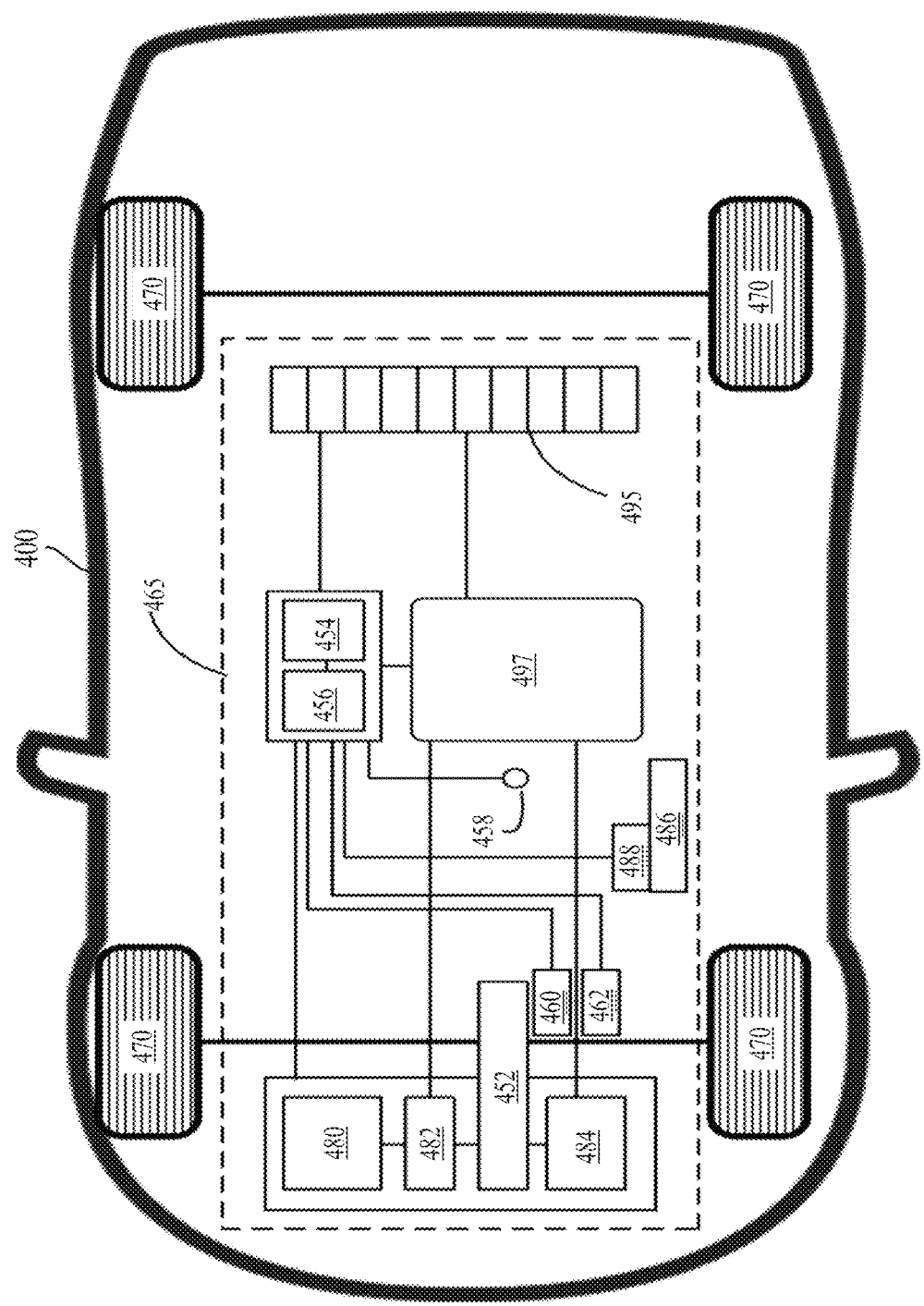

FIGS. 4A and 4B are diagrams illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the sensor module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward-facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

FIG. 4B is a diagram illustrating an example of a vehicle 400, in accordance with various aspects of the present disclosure. It should be understood that various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium-ion batteries, lead acid batteries, nickel cadmium batteries, lithium ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules.

In autonomous driving, the vehicle 400 predicts a diverse set of futures in order to take into account different plausible actions of other agents. Aspects of the present disclosure propose diverse SPF for the task of sequential point cloud forecasting (SPF). A diverse SPF may be composed of a vector-quantized conditional variational autoencoder (VQ-CVAE) and a partial denoising diffusion probabilistic model (DDPM). In operation, the diverse SPF system first generates diverse samples of future point cloud predictions with VQ-CVAE. Once the samples are generated, the diverse SPF system uses a partial denoising process to refine the predictions to improve their fidelity, for example, as shown in FIG. 5.

Figure 5:
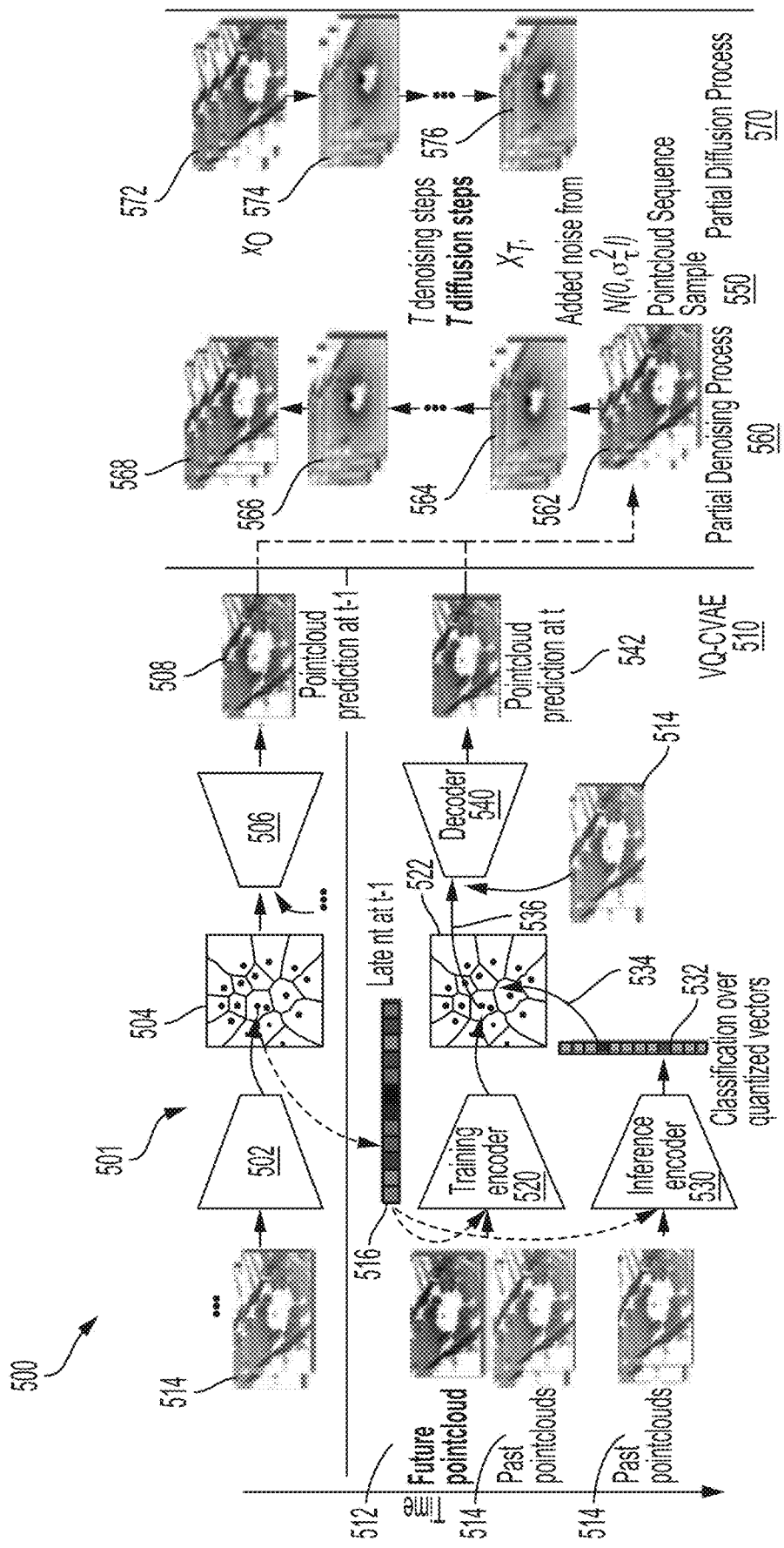
FIG. 5 is a block diagram illustrating a diverse sequential point cloud forecasting system, according to aspects of the present disclosure.

FIG. 5 is a block diagram illustrating a diverse sequential point cloud forecasting system 500, according to aspects of the present disclosure. In some aspects of the present disclosure, the diverse sequential point cloud forecasting system 500 includes a vector-quantized (VQ)-conditional variational autoencoder (VQ-CVAE) framework 510 for sequential point cloud forecasting. In this example, the VQ-CVAE framework 510 model autoregressively predicts a future point cloud 542 at time $t \in [1, \ldots N]$. During training time, a training encoder 520 takes a future point cloud 512, a previously sampled latent space (zt) 516 (e.g., zt-1), and a past point cloud sequence 514 as input, and maps the output to the closest vector in the discrete latent space 522, obtaining zt. At inference time, an inference encoder 530 takes in previously sampled latent space zt-1 516 and the past point cloud sequence 514 as input, and outputs a probability over V vectors in the discrete latent space as a classification over quantized vectors 532. Subsequently, the future latent space zt 534 is sampled from the output categorical distribution of the classification over quantized vectors 532. The future point cloud 542 at time t is predicted via a decoder 540 that takes in the sampled latent variable zt 536 and features of the past point cloud sequence 514.

In some aspects of the present disclosure, the diverse sequential point cloud forecasting system 500 includes a partial denoising diffusion probabilistic model (DDPM) 550 to refine the predicted, future point cloud 542. In this aspect of the present disclosure, the DDPM 550 performs a partial denoising process 560, followed by a partial diffusion process 570. The partial denoising process 560 begins by adding noise to a point cloud sequence sample 562 including the predicted, future point cloud 542 and a previously predicted point cloud sequence 508. In this example, the previously predicted point cloud sequence 508 is provided from a previous VQ-CVAE framework 501, including an encoder 502 to provide a latent space 504 in response to the past point cloud sequence 514, and a decoder 506 to decode the latent space 504 to provide the previously predicted point cloud sequence 508. The denoising process starts at step K'<K, and is performed for a predetermined number of steps (e.g., K').

The partial denoising process 560 generates the noise added point cloud sequence 564 by adding the noise to the point cloud sequence sample 562 at step $x_T$. Next, T denoising steps are performed to generate an intermediate denoised point cloud sample 566 and a final denoised point cloud sample 568 at step $x_0$. At step $x_0$; the partial diffusion process begins with a denoised point cloud sample 572. An initial diffused point cloud sequence sample 574 is generated as an initial step of T diffusion steps to generate a final point cloud sequence sample 576.

1. Diverse Sequential Point Cloud Forecasting (DiverseSPF)

Some aspects of the present disclosure describe a method for DiverseSPF, which generates diverse and high-fidelity point cloud sequence forecasts by combining a VQ-CVAE with a DDPM. This method for DiverseSPF start by defining the task of SPF. Let $S_p = \{S_{1-M}, \ldots, S_0\}$ denote M frames of past point clouds of a scene and $S_f = \{S_1, \ldots, S_N\}$ denote N frames of future point clouds. This DiverseSPF process is directed to learning a generative model that maximizes the probability $p(S_f | S_p)$.

Some aspects of the present disclosure adopt a VQ-CVAE paired with a DDPM as generative model. Additionally, a VQ-CVAE is utilized to generate diverse samples, followed by a partial DDPM to refine the predictions. Standard DDPM contains diffusion and denoising processes of length K, where K=1000 is possible choice. In aspects of the present disclosure, a partial DDPM considers the forward and backward processes stopped at an intermediate step K=K'<K, for example, as shown in partial denoising process 560 of FIG. 5. This partial DDPM is sufficient because the VQ-CVAE is utilized as an approximation of the real data distribution. In practice, samples are diffused from the VQ-CVAE to approximate sampling from the diffused distribution at step K'.

At training time, the combined model with partial DDPM and VQ-CVAE encodes $S_f$ to a sequence of discrete latent variables $Z = \{Z_1, \ldots, Z_N\}$, as well as diffused pointcloud sequences $S_f^{1:K'}$, defined as $$q(S_f^{1:K'}, Z | S_f^0, S_p) = q(S_f^{1:K'} | S_f^0, S_p) q_\psi(Z | S_f^{1:K'}, S_f^0, S_p)$$
$$= q(S_f^{1:K'} | S_f^0) q_\psi(Z | S_f^0, S_p),$$

where $q_\psi(Z | S_f^0, S_p)$ corresponds to the posterior of the VQ-CVAE, and $q(S_f^{1:K'} | S_f^0)$ is a partial diffusion process.

At inference time, the sampling process can be formulated as $$p(S_f^{0:K'}, Z | S_p) = p_\rho(Z | S_p) p_\theta(S_f^{K'} | Z, S_p) p_\phi(S_f^{0:K'-1} | S_f^{K'}, S_p, Z),$$

where $p_\rho(Z | S_p)$ corresponds to the prior, $p_\theta(S_f^{K'} | Z, S_p)$ corresponds to the decoder of the VQ-CVAE, and $p_\phi(S_f^{0:K'-1} | S_f^{K'}, S_p, Z)$ is the reverse denoising process of the partial DDPM. Following this formulation, it can be proven that $$\log p(S_f^0 | S_p) \geq -(L_{CVAE} + L_{DDPM}), \quad (1)$$

in which $$L_{CVAE} = D_{KL}(q_\psi(Z | S_f^0, S_p) \| p_\rho(Z | S_p)) +$$
$$E_{q_\psi Z | S_f^0, S_p} D_{KL}(q(S_f^{K'} | S_p) \| p_\theta(S_f^{K'} | Z, S_p)), L_{DDPM}$$
$$= -E_{q_{S_f^1 | S_f^0}} \log p_\phi(S_f^0 | S_f^1, S_p, Z) +$$
$$\sum_{\kappa=2}^{K'} E_{q_{S_f^\kappa | S_f^0}} D_{KL}(q(S_f^{\kappa-1} | S_f^\kappa, S_f^0) \| p_\phi(S_f^{\kappa-1} | S_f^\kappa, S_p, Z)).$$

As described in Equation, $L_{DDPM}$ is equivalent to the loss of a standard DDPM, except that training is performed for steps $\kappa \in [1, \ldots, K']$, and $L_{CVAE}$ is equivalent to train a CVAE on clean point cloud sequences $S_f^0$ in the dataset. The decomposition of the loss separates the optimization of the components of CVAE (posterior $q_\psi$, prior $p_\rho$, decoder $p_\theta$) from the optimization of DDPM (denoising function $p_\phi$). Therefore, the partial DDPM and the VQ-CVAE are separately train, and then combined them to obtain a new generative model. These the details are further discussed in Section 1.2 and Section 1.3.

1.1. Input and Output Representation: Range Map

To represent a point cloud $S = \{(x, y, z)_j\}_{j=1}^J$, where J is the total number of points, some aspects of the present disclosure use the range map representation $\mathcal{R} \in \mathbb{R}^{H \times W \times 1}$. Each range map can be viewed as a 1-channel image, with every pixel corresponding to a point in 3D and the pixel value storing the Euclidean distance $d = \sqrt{x^2+y^2+z^2}$ of the point to the LIDAR sensor. Some aspects of the present disclosure use spherical projection to convert a point cloud to a range map. Specifically, for a point $p=(x, y, z)$ in the Cartesian coordinate, its coordinate in the range map $(\zeta, \xi)$ can be computed as:

$$\zeta = arctan(y | x), \quad (2)$$
$$\xi = \arcsin(z / \sqrt{x^2 + y^2 + z^2}) = \arcsin(z/d), \quad (3)$$

where $\zeta, \xi$ are the azimuth, elevation angle. Since d is stored in the range map, one can also apply inverse spherical projection to recover the $p=(x, y, z)$ as:

$$z = \sin(\xi) \times d,$$
$$x = \cos(\zeta) \times \cos(\xi) \times d,$$
$$y = \sin(\zeta) \times \cos(\xi) \times d.$$

1.2. VQ-CVAE

This section first describes the VQ-CVAE component of the DiverseSPF process, which uses a discrete latent space to generate diverse forecasts. The forecasts will be refined by a partial DDPM, which is explained in Section 1.3.

Some aspects of the present disclosure adapt a VQ-CVAE framework for SPF, for example, as shown in FIG. 5, which can be formulated as point cloud sequence generation conditioned on past point cloud sequence. The overall VQ-CVAE framework is illustrated in the diverse sequential point cloud forecasting system 500 of FIG. 5.

In some aspects of the present disclosure, the VQ-CVAE generates sequential prediction in an autoregressive manner, for $t \in [1, \ldots, N]$. Consider the prediction time t. Let $z_t$ represent the sampled discrete latent variable, $S_t$ represent groundtruth pointcloud, and $c_t$ represent the context of the prediction task, which consists of the previously sampled latent variable $z_{t-1}$ and the past pointcloud sequence $\mathcal{S}_t = \{S_{1-M}, \ldots, S_{t-1}\}$. The VQ-CVAE framework consists of (1) a discrete latent space, (2) a training encoder parameterizing the categorical posterior distribution $q(z_t|S_t, c_t)$, (3) an inference encoder parameterizing the categorical prior distribution $p(z_t|c_t)$, and (4) a decoder with distribution $p(S_t|z_t, c_t)$.

Vector Quantization. Some aspects of the present disclosure adopt vector quantization to avoid posterior collapse. Let $t \in \mathbb{R}^{V \times D}$ denote the discrete embedding space, where V is the size of the discrete latent space and D is the dimensionality of each latent vector $e_i$ for $i \in [1, V]$. The posterior distribution is a categorical distribution defined as $$q(z_t = v \mid S_t, c_t) = \begin{cases} 1 & \text{for } v = \operatorname{argmin}_j \|f_\psi(S_t, c_t) - e_j\|_2 \\ 0 & \text{otherwise} \end{cases},$$

where $f_\psi(S_t, c_t)$ represents output from the inference encoder network parameterized by $\psi$. Note that $q(z_t = v | S_t, c_t)$ is one-hot, and the latent variable $z_t$ is deterministically mapped to the nearest neighbor in the latent embedding space.

The prior distribution, $p(z_t|c_t)$, is a categorical distribution over the V vectors in the embedding space, parameterized by a classification network $f_\rho(z_t)$. At inference time, the model samples $z_t$ from $p(z_t|c_t)$, and passes $z_t$ along with $c_t$ to the decoder.

Training and Inference Encoder. The training encoder and inference parameterize $q(z_t|S_t, c_t)$ and $p(z_t|c_t)$ respectively. Their architectures are similar, except that the training encoder takes ground truth future pointcloud $S_t$ as an additional input.

Both encoders operate on range maps converted from point clouds. The architecture mainly consists of the following components: (1) a range encoder to extract features from each individual range map $R_t$ at different levels $l \in [1, \ldots, L]$, and (2) Pyramid LSTMs to propagate range map features through time.

Decoder. The range decoder takes as input the concatenated LSTM hidden state and sampled latent variable. The range decoder has the inverse structure as the range decoder, except that the input channel of the first layer is increased to accommodate the concatenated latent variable $z_t$. A range mask $M'_t$ is predicted with the same architecture with different weights. After the decoder outputs a prediction of range map $R'_t$, $S'_t$ can be obtained by the inverse projection as described in Section 1.1.

Training objectives. Some aspects of the present disclosure employ the following objective to train the disclosed VQ-CVAE:

$$L = L^{recon} + L^{vq} + \beta L^{commit} + \gamma L^{prior}, \quad (4)$$

where $L^{recon} = \log p(S_t|f_\psi(S_t, c_t), c_t)$ represents the reconstruction loss, $L^{vq} = \|sg[z_\theta(S_t, c_t)] - e\|_2^2$, represents the vector quantization loss, $L^{commit} = \|z_\theta(S_t, c_t) - sg[e]\|_2^2$, represents the commitment loss, and $L^{prior} = -\Sigma_k q(z_t = k|S_t, c_t) \log p(z_t = k|S_t, c_t)$ represents the classification loss of the prior. These aspects of the present disclosure use a definition of reconstruction loss specialized for the task of SPF:

$$\mathcal{L}^{recon} = \sum_{t=1}^{N} (\alpha \mathcal{L}_t^{cd} + \kappa \mathcal{L}_t^{L1} + \omega \mathcal{L}_t^{bce}), \quad (5)$$

in which
1. $\mathcal{L}_t^{cd}$ corresponds to the Chamfer distance between predicted point cloud $S'_t$, and the groundtruth pointcloud $S_t$ at time t:

$$\mathcal{L}_t^{cd} = \sum_{u' \in S'_t} \min_{u \in S_t} \|u - u'\|_2^2 + \quad (6)$$

$$\sum_{u \in S_t} \min_{u' \in S'_t} \|u - u'\|_2^2, \quad (7)$$

2. $\mathcal{L}_t^{L1}$ corresponds to $L_1$ distance $\mathcal{L}_t^{L1}$ between the predicted range map $R'_t$ and GT range map $R_t \in \mathbb{R}^{H \times W \times 2}$ at every valid pixel:

$$\mathcal{L}_t^{L1} = \sum_i^H \sum_j^W \|M_{ti,j}(R'_{ti,j} - R_{ti,j})\|_1, \quad (8)$$

3. $\mathcal{L}_t^{bce}$ corresponds to binary cross-entropy loss $\mathcal{L}_t^{bce}$ between the predicted mask $M'_t$ and GT mask $M_t$ to every pixel:

$$\mathcal{L}_t^{bce} = \sum_i^H \sum_j^W -(1 - M_{ti,j}) \log(1 - M'_{ti,j}) - M_{ti,j} \log(M'_{ti,j}). \quad (9)$$

1.3. Partial DDPM

These aspects of the present disclosure refine the predictions from VQ-CVAE with a partial Denoising Diffusion Probabilistic Model (DDPM). While the standard diffusion and denoising processes consist of K steps, some aspects of the present truncate both processes into a length of K' < K.

The Diffusion Process. The forward diffusion process is a Markovian process that iteratively adds Gaussian noise to range map $x_0$ over K' iterations:

$$q(\mathcal{S}_f^{\kappa+1} \mid \mathcal{S}_f^\kappa) = \mathcal{N}(\mathcal{S}_f^{\kappa-1}; \sqrt{\alpha^\kappa} \mathcal{S}_f^{\kappa-1}, (1 - \alpha^\kappa)I)$$

$$q(\mathcal{S}_f^{1:K'} \mid \mathcal{S}_f^0) = \prod_{k=1}^{K'} q(\mathcal{S}_f^\kappa \mid \mathcal{S}_f^{\kappa-1}),$$

where $\alpha^k$ corresponds to hyperparameters of the noise schedule. The standard diffusion process takes all of the K steps, whereas aspects of the present disclosure consider the initial K' steps.

Similar to standard DDPM, some aspects of the present disclosure marginalize the forward process at each step K:

$$q(\mathcal{S}_f^\kappa \mid \mathcal{S}_f^0) = \mathcal{N}(\mathcal{S}_f^\kappa; \sqrt{\overline{\alpha}^\kappa} \mathcal{S}_f^0, (1 - \overline{\alpha}^\kappa)I), \quad (10)$$

where $\overline{\alpha}^\kappa = \Pi_{i=1}^\kappa \alpha^i$. The posterior distribution of $\mathcal{S}_f^{\kappa-1}$ given $\mathcal{S}_f^0$ and $\mathcal{S}_f^\kappa$ can be formulated $$q(\mathcal{S}_f^{\kappa-1} \mid \mathcal{S}_f^0, \mathcal{S}_f^\kappa) = \mathcal{N}(\mathcal{S}_f^{\kappa-1} \mid u, \sigma^2 I), \quad (11)$$

in which $$\mu = \frac{\sqrt{\overline{\alpha}^{\kappa-1}}(1-\alpha^{\kappa})}{1-\overline{\alpha}^{\kappa}}S_f^0 + \frac{\sqrt{\alpha^{\kappa}}(1-\overline{\alpha}^{\kappa-1})}{1-\overline{\alpha}^{\kappa}}S_f^{\kappa}, \quad (12)$$

$$\sigma^2 = \frac{(1-\overline{\alpha}^{\kappa-1})(1-\alpha^{\kappa})}{1-\overline{\alpha}^{\kappa}}. \quad (13)$$

Training. During training, a refinement module learns the reverse denoising process, where the goal is to recover the target range map sequence $S_f^0$ given a noisy range map sequence $\tilde{S}_f$:

$$\tilde{S}_f = \sqrt{\overline{\alpha}}\,S_f^0 + \sqrt{1-\overline{\alpha}}\,\epsilon,\ \epsilon\sim\mathcal{N}(0,I). \quad (14)$$

A model $f_\phi(S_p, \tilde{S}_f, K)$ is trained to condition on past point cloud sequences $S_p$, the noise range map sequence $\tilde{S}_f$, and the current step x to predict the noise vector ε. The model is trained to solve the following optimization problem:

$$\arg\min_\phi \mathbb{E}_{(S_p, S_f)}\mathbb{E}_{\epsilon,\overline{x}}\|f_\phi(S_p, \tilde{S}_f, \kappa)\|_p^p, \quad (15)$$

which is equivalent to maximizing a weighted variational lower bound of the likelihood.

Inference. Following Equation 14, given $S_f^\kappa$, $\tilde{S}_f^0$ is predicted as $$\hat{S}_f^0 = \frac{1}{\sqrt{\overline{\alpha}^\kappa}}(S_f^\kappa - \sqrt{1-\overline{\alpha}^\kappa}f_\phi(S_p, S_f^\kappa, \kappa)). \quad (16)$$

By substituting $\hat{S}_f^0$ into Equation 11, the mean of $p_\phi(S_f^{\kappa-1}|S_f^\kappa, S_p, Z)$ is parameterized as $$\mu_\phi(S_f^\kappa, S_p, \overline{\alpha}^\kappa) = \frac{1}{\sqrt{\alpha^\kappa}}\left(S_f^\kappa - \frac{1-\alpha^\kappa}{\sqrt{1-\overline{\alpha}^\kappa}}f_\phi(S_p, S_f^\kappa, \kappa)\right), \quad (17)$$

and the variance is set to $(1-\alpha^\kappa)$ following. Therefore, each iteration of the denoising process is defined as $$S_f^{\kappa-1} \leftarrow \frac{1}{\sqrt{\alpha^\kappa}}\left(S_f^\kappa - \frac{1-\alpha^\kappa}{\sqrt{1-\overline{\alpha}^\kappa}}f_\phi(S_p, S_f^\kappa, \kappa)\right) + \sqrt{1-\alpha^\kappa}\,\epsilon_t. \quad (18)$$

The Standard DDPM inference takes K iterations to denoise starting from $\mathcal{N}(0,I)$. Instead, $S_j^{K'}$ is sampled from $$p_\theta(S_j^{K'} \mid Z, S_p) \sim \mathcal{N}(S_j^{K'}; \sqrt{\overline{\alpha}^\kappa}f_\theta(Z, S_p), (1-\overline{\alpha}^\kappa)I) \quad (19)$$

where $f_\theta(Z, S_p)$ represents the decoder of the disclosed VQ-CVAE, for example, as shown in FIG. 5. Then, the reverse denoising process IS deployed following Equation 18 for $\kappa\in[K',\ldots,1]$, and the estimation $S_f^0$ is obtained.

Denoising Network for $f_\phi\cdot f_\phi(S_p, S_f^\kappa, \kappa)$ operates on range map sequences $\mathcal{R}_f$, $\mathcal{R}_p$ projected from pointcloud sequences $S_f$, $S_p$, where the conversion is defined in Section 1.1. Some aspects of the present disclosure adopt a U-Net architecture for the denoising network, featuring a spatial down-sampling pass followed by a spatial up-sampling pass with skip connections. The network is built from 3D convolutional residual blocks, where each block is followed by a spatial attention block and a temporal attention block. Conditioning may be modeled via concatenation. A process for diverse sequential point cloud forecasting is further described in FIG. 6.

Figure 6:
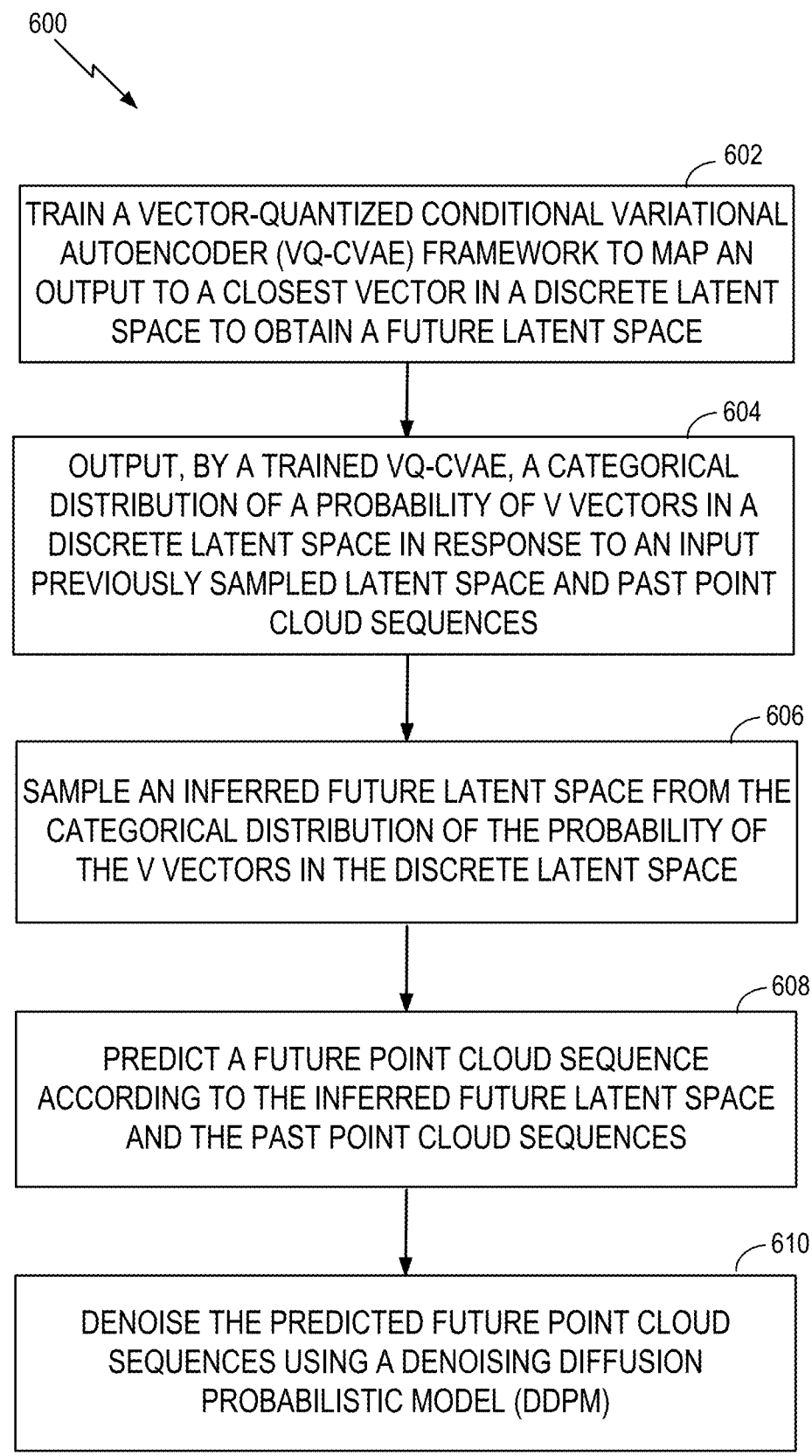
FIG. 6 is a flowchart illustrating a method for diverse sequential point cloud forecasting, according to aspects of the present disclosure.

FIG. 6 is a flowchart illustrating a method for diverse sequential point cloud forecasting, according to aspects of the present disclosure. The of method 600 of FIG. 6 begins at block 602, a vector-quantized conditional variational autoencoder (VQ-CVAE) framework is trained to map an output to the closest vector in a discrete latent space to obtain a future latent space. For example, as shown in FIG. 5, during training time, a training encoder 520 takes a future point cloud 512, a previously sampled latent space (zt) 516 (e.g., zt−1), and a past point cloud sequence 514 as input, and maps the output to the closest vector in the discrete latent space 522, obtaining zt. At block 604, a trained VQ-CVAE output a categorical distribution of a probability of V vectors in a discrete latent space in response to an input previously sampled latent space and past point cloud sequences. For example, as shown in FIG. 5, At inference time, an inference encoder 530 takes in previously sampled latent space zt−1 516 and the past point cloud sequence 514 as input, and outputs a probability over V vectors in the discrete latent space as a classification over quantized vectors 532.

At block 606, sample an inferred future latent space from the categorical distribution of the probability of the V vectors in the discrete latent space. For example, as shown in FIG. 5, the future latent space zt 534 is sampled from the output categorical distribution of the classification over quantized vectors 532. At block 608, a future point cloud sequence is predicted according to the inferred future latent space and the past point cloud sequences. For example, as shown in FIG. 5, The future point cloud 542 at time t is predicted via a decoder 540 that takes in the sampled latent variable zt 536 and features of the past point cloud sequence 514. At block 610, a denoising diffusion probabilistic model (DDPM) denoises the predicted future point cloud sequences according to an added noise. For example, as shown in FIG. 5, the diverse sequential point cloud forecasting system 500 includes a partial denoising diffusion probabilistic model (DDPM) 550 to refine the predicted, future point cloud 542.

Some aspects of the present disclosure are directed a diverse sequential point cloud forecasting method that overcomes the noted challenges. In some aspects of the present disclosure, the diverse SPF system is composed of a vector-quantized conditional variational autoencoder (VQ-CVAE) stage, followed by a partial denoising diffusion probabilistic model (DDPM). Unlike standard DDPMs, the forward and backward processes of a partial DDPM involves a fraction of the total number of steps. At inference time, the diverse SPF samples from the VQ-CVAE, which is an approximation of the real data distribution, adds noise to the sample, and starts the denoising process from the diffused sample. This diverse SPF system improves the diversity of future point cloud predictions by using a discrete latent space and improves the fidelity of the predictions via a partial denoising process.

In some aspects of the present disclosure, the method 600 may be performed by the system-on-a-chip (SOC) 100 (FIG. 1) or the software architecture 200 (FIG. 2) of the ego vehicle 150 (FIG. 1). That is, each of the elements of the method 600 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for sequential point cloud forecasting, comprising:
   training a vector-quantized conditional variational auto-encoder (VQ-CVAE) framework to map an output to a closest vector in a discrete latent space to obtain a future latent space;
   outputting, by a trained VQ-CVAE, a categorical distribution of a probability of V vectors in the discrete latent space in response to an input previously sampled latent space and past point cloud sequences;
   sampling an inferred future latent space from the categorical distribution of a probability of the V vectors in the discrete latent space;
   predicting a future point cloud sequence according to the inferred future latent space and the past point cloud sequences; and
   denoising the predicted, future point cloud sequences using a denoising diffusion probabilistic model (DDPM).

2. The method of claim 1, in which training comprises feeding a training encoder of the VQ-CVAE framework with a future point cloud, the input previously sampled latent space, and past point cloud sequences to predict a future latent space.

3. The method of claim 1, in which outputting comprises:
   feeding an inference encoder of the trained VQ-CVAE with the previously sampled latent space, and past point cloud sequences;
   inferring, by the inference encoder, a classification over quantized vectors; and
   sampling the future latent space sampled from the output categorical distribution.

4. The method of claim 1, in which sampling comprises sampling, by a decoder, the future latent space from the output categorical distribution.

5. The method of claim 1, in which predicting comprises predicting, by a decoder, the future point cloud at time t in response to the sampled latent space and features of past point cloud sequences.

6. The method of claim 1, in which denoising comprises:
performing a partial denoising process on the predicted, future point cloud sequence to generate a denoised, future point cloud sequence; and
performing a partial diffusion process on the denoised, future point cloud sequence.

7. The method of claim 6, in which performing the partial denoising process comprises:
adding noise to a point cloud sequence sample including the predicted, future point cloud sequence and a previously predicted point cloud sequence; and
removing the noise from the point cloud sequence sample over a predetermined number of steps to provide the denoised, future point cloud sequence.

8. The method of claim 1, further comprising planning a trajectory of an ego vehicle according to a predicted, future point cloud sequence of agents within a scene surrounding the ego vehicle.

9. A non-transitory computer-readable medium having program code recorded thereon for sequential point cloud forecasting, the program code being executed by a processor and comprising:
program code to train a vector-quantized conditional variational autoencoder (VQ-CVAE) framework to map an output to a closest vector in a discrete latent space to obtain a future latent space;
program code to output, by a trained VQ-CVAE, a categorical distribution of a probability of V vectors in the discrete latent space in response to an input previously sampled latent space and past point cloud sequences;
program code to sample an inferred future latent space from the categorical distribution of a probability of the V vectors in the discrete latent space;
program code to predict a future point cloud sequence according to the inferred future latent space and the past point cloud sequences; and
program code to denoising the predicted, future point cloud sequences using a denoising diffusion probabilistic model (DDPM).

10. The non-transitory computer-readable medium of claim 9, in which the program code to train comprises program code to feed a training encoder of the VQ-CVAE framework with a future point cloud, the input previously sampled latent space, and past point cloud sequences to predict a future latent space.

11. The non-transitory computer-readable medium of claim 9, in which the program code to output comprises:
program code to feed an inference encoder of the trained VQ-CVAE with the previously sampled latent space, and past point cloud sequences;
program code to infer, by the inference encoder, a classification over quantized vectors; and
program code to sample the future latent space sampled from the output categorical distribution.

12. The non-transitory computer-readable medium of claim 9, in which the program code to sample comprises program code to sample, by a decoder, the future latent space from the output categorical distribution.

13. The non-transitory computer-readable medium of claim 9, in which the program code to predict comprises program code to predict, by a decoder, the future point cloud at time t in response to the sampled latent space and features of past point cloud sequences.

14. The non-transitory computer-readable medium of claim 9, in which the program code to denoise comprises:
program code to perform a partial denoising process on the predicted, future point cloud sequence to generate a denoised, future point cloud sequence; and
program code to perform a partial diffusion process on the denoised, future point cloud sequence.

15. The non-transitory computer-readable medium of claim 14, in which the program code to perform the partial denoising process comprises:
program code to add noise to a point cloud sequence sample including the predicted, future point cloud sequence and a previously predicted point cloud sequence; and
program code to remove the noise from the point cloud sequence sample over a predetermined number of steps to provide the denoised, future point cloud sequence.

16. The non-transitory computer-readable medium of claim 9, further comprising program code to plan a trajectory of an ego vehicle according to a predicted, future point cloud sequence of agents within a scene surrounding the ego vehicle.

17. A system for sequential point cloud forecasting, the system comprising:
a vector-quantized (VQ) conditional variational autoencoder (VQ-CVAE) training module to train a VQ-CVAE framework to map an output to a closest vector in a discrete latent space to obtain a future latent space;
a trained VQ-CVAE to output a categorical distribution of a probability of V vectors in the discrete latent space in response to an input previously sampled latent space and past point cloud sequences;
a latent space inference model to sample an inferred future latent space from the categorical distribution of a probability of the V vectors in the discrete latent space;
a point cloud prediction model to predict a future point cloud sequence according to the inferred future latent space and the past point cloud sequences; and
a point cloud denoising model to denoise the predicted, future point cloud sequences using a denoising diffusion probabilistic model (DDPM).

18. The system of claim 17, in which the VQ-CVAE) training module is further to feed a training encoder of the VQ-CVAE framework with a future point cloud, the input previously sampled latent space, and past point cloud sequences to predict a future latent space.

19. The system of claim 17, in which the point cloud denoising model is further to perform a partial denoising process on the predicted, future point cloud sequence to generate a denoised, future point cloud sequence, and to perform a partial diffusion process on the denoised, future point cloud sequence.

20. The system of claim 17, further comprising a planner module to plan a trajectory of an ego vehicle according to a predicted, future point cloud sequence of agents within a scene surrounding the ego vehicle.

* * * * *